No. 760,923. PATENTED MAY 24, 1904.
A. J. RUSH.
STALK CUTTER.
APPLICATION FILED SEPT. 25, 1903.
NO MODEL. 3 SHEETS—SHEET 3.
_Fig. 4._
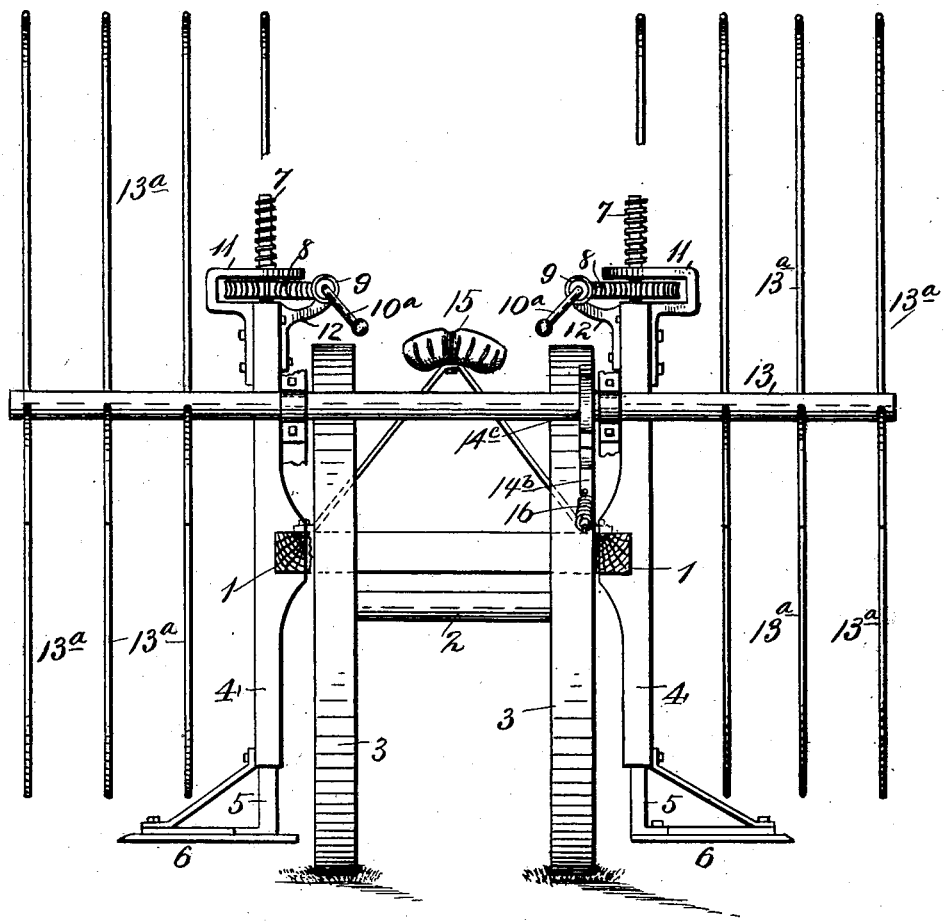

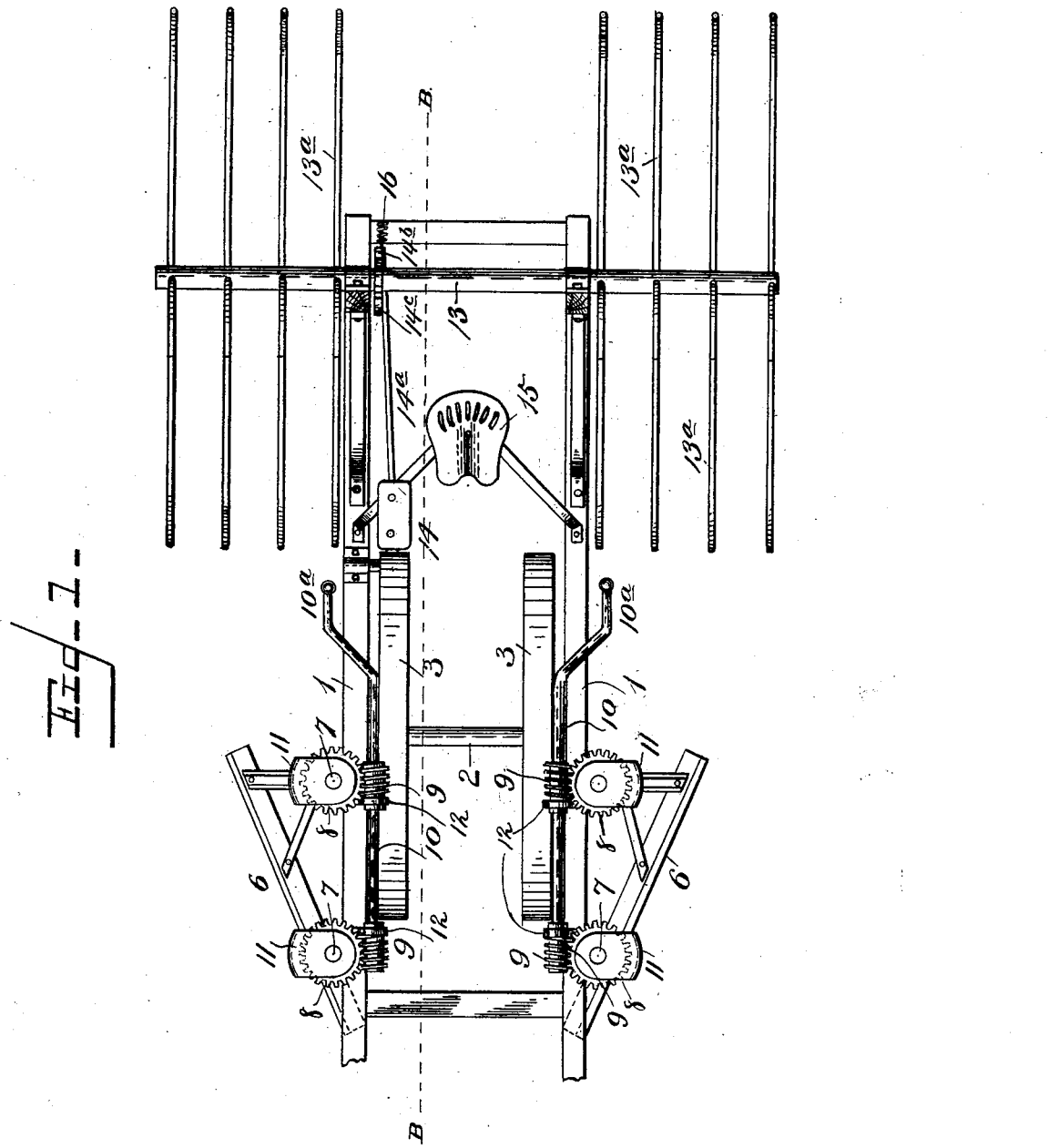

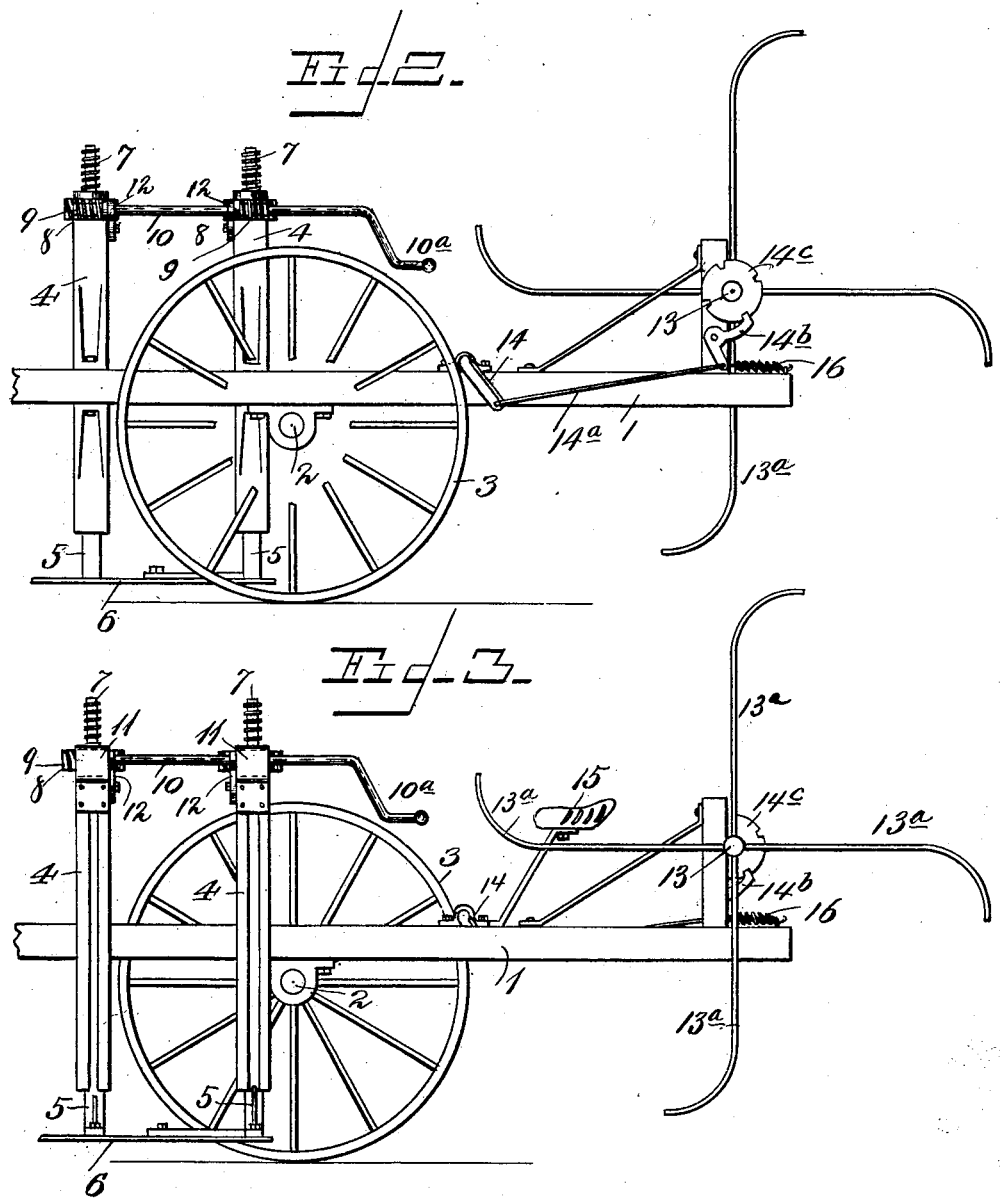

No. 760,923. Patented May 24, 1904.

UNITED STATES PATENT OFFICE.

ANDREW J. RUSH, OF LAKECREEK, TEXAS.

STALK-CUTTER.

SPECIFICATION forming part of Letters Patent No. 760,923, dated May 24, 1904.

Application filed September 25, 1903. Serial No. 174,657. (No model.)

*To all whom it may concern:*

Be it known that I, ANDREW J. RUSH, a citizen of the United States, residing at Lakecreek, in the county of Delta and State of Texas, have invented new and useful Improvements in Stalk-Cutters, of which the following is a specification.

My invention relates to certain improvements in cotton-stalk cutters, which is equally applicable for cutting cornstalks.

Said invention has for its object to provide for readily and effectively cutting cotton-stalks, as well as cornstalks, standing in a field and to follow up this cutting action with the engaging or "bunching" of the cut stalks. It also provides for effecting the ready adjustment of the cutting apparatus as may be required to "clear" or avoid contact with stumps or other obstacles and to control the height of the cutting of the stalks from the surface or ground.

Said invention consists of the combination of parts, including their construction and arrangement, substantially as hereinafter more fully disclosed, and specifically pointed out by the claims concluding the following specification.

In the accompanying drawings, illustrating the preferred embodiment of my invention, Figure 1 is a plan view thereof. Fig. 2 is a sectional elevation produced on the line B B of Fig. 1. Fig. 3 is a side elevation, and Fig. 4 is a rear elevation, of the same.

In the carrying out of my invention I mount a frame 1 of suitable dimensions, say, to pass between two rows of cotton-stalks or cornstalks upon an axle 2, borne by wheels 3. Supported laterally of and upon each longitudinal or lateral bar of said frame near the forward end of the latter are two hollow upright guides 4, each with a vertical slot extending longitudinally thereof, said guides depending a suitable distance below said frame and extending similarly thereabove for carrying standards 5, to each pair of which standards is secured or connected, preferably, as shown, by gibs or otherwise, a horizontal obliquely-arranged knife or cutter 6, with its cutting edge presented forward and disposed laterally of the path of travel of the frame-bearing wheels. Said standards have suitably applied or secured to their upper ends vertical screws 7, extending a suitable distance upward, and threaded upon these screws are obliquely toothed or cogged pinions 8, with which mesh worms or pinions 9, carried by hand-actuated shafts 10, having handles or cranks $10^a$ for their actuation. Said standards have secured thereto looped or rebent arms 11, with their loops receiving the pinions 8 and their upper or rebent portions adapted to permit the passage therethrough of the screws 7, thus serving to steady or brace the same. The worms 9 have their shafts journaled in suitable bearings or brackets 12, secured laterally to the guides 4. By the actuation of the handled shafts 10, in turn actuating the knife-carrying standards 5, the knives or cutters 6 may be vertically adjusted according to the height it may be desired to dispose them for cutting the cotton or corn stalks and for "clearing" or avoiding contact with stumps or other obstacles which may be in their path of travel.

Upon the frame 1 at its rear end is suitably journaled or mounted a shaft 13, carrying duplicate series of reel-arms $13^a$, the individual arms crossing each other and adapted by their rotation as they engage the cut stalks resting upon the ground to engage or "bunch up" said stalks as the machine advances in the operation of cutting said stalks.

A pedal or foot-lever 14 is hung or pivoted upon the frame 1 within convenient reach of the foot of the driver occupying the seat 15, suitably secured or mounted in position upon the frame 1, said foot-lever having rod connection $14^a$ with a dog or detent $14^b$, suitably pivoted in place and adapted to engage a notched disk or ratchet $14^c$, secured to the reel-shaft 13 to provide for the retention of the reel-shaft and arms as against rotation when such is desired. A spring 16, secured or connected to the frame 1 and the dog or detent $14^b$, serves to automatically engage the first named with the notched disk or ratchet $14^c$. The action or pressure of the foot upon the pedal or foot-lever 14 overcoming the action of the spring 16 effects the disengagement of said dog or detent from said ratchet to permit the reel to rotate, as when the machine is in operation.

It will be understood that latitude is allowed herein as to details, as they may be changed as circumstances suggest without departing from the spirit of my invention and said invention still be protected.

In cutting cornstalks instead of cotton-stalks serrated-edged knives are used.

Having thus described my invention, what I claim, and desire to secure by Letters Patent, is—

1. In a machine of the character described, a cutter presented obliquely to the object acted upon, standards having screw-threaded upper end portions and carrying said cutter, tubular guides adapted to permit vertical movement of said standards, pinions arranged upon and engaging said screw-threaded upper end portions of said standards, and a handled shaft having worms meshing with said pinions.

2. In a machine of the character described, a cutter presented obliquely to the object for treatment, standards carrying said cutter, tubular guides suspended about their mid-length, said standards carrying vertical screws at their upper ends, pinions having obliquely-pitched threads and threaded upon said screws, and a manually-actuated shaft carrying worms geared to said pinions.

In testimony whereof I have signed my name to this specification in the presence of two subscribing witnesses.

ANDREW J. RUSH.

Witnesses:
J. N. YEAGER,
W. C. YEAGER.